United States Patent [19]

Hindström et al.

[11] Patent Number: 5,039,347
[45] Date of Patent: Aug. 13, 1991

[54] METHOD FOR CLEANING THE FILTER PLATES OF A SUCTION DRIER

[75] Inventors: Rolf Hindström, Turku; Jorma Punju, Tampere, both of Finland

[73] Assignee: Outokumpu Oy, Espoo, Finland

[21] Appl. No.: 540,898

[22] Filed: Jun. 20, 1990

[30] Foreign Application Priority Data

Jun. 29, 1989 [FI] Finland .................................. 893183

[51] Int. Cl.$^5$ ............................................ B01D 33/24
[52] U.S. Cl. ............................. 134/1; 134/184; 210/384; 210/393; 210/394; 210/408; 210/785
[58] Field of Search ............ 134/1, 184; 210/785, 210/384, 393, 394, 408

[56] References Cited

U.S. PATENT DOCUMENTS 4,946,602  8/1990  Ekberg et al. ........................... 134/1
4,971,920  9/1990  Niyashita et al. ....................... 134/1

Primary Examiner—Asok Pal
Attorney, Agent, or Firm—Brooks Haidt Haffner & Delahunty

[57] ABSTRACT

The invention relates to a method for cleaning the filter plates of a suction drier, which suction drier (20) comprises a tank (13) for the slurry to be suction dried, in connection to which tank there rotates one or several filter disks formed of the said filter plates (14), on the surface or surfaces of which filter plates (14) there is collected and dried, owing to the suction flow passing through the filter plates (14), a filter cake, which is scraped or otherwise removed from the surface or surfaces of the filter plates. For the cleaning of the porous structure and surfaces of the said filter plates (14), there is arranged, in the tank (13) of the slurry to be filtered, under the liquid surface (11), mainly in the surface water area, an ultrasonic vibrator or vibrators (10), whereto ultrasonic electric power is fed from an ultrasonic generator (22). The cleaning with the ultrasonic vibrator or vibrators (10) is carried out esentially immediately after scraping.

6 Claims, 2 Drawing Sheets

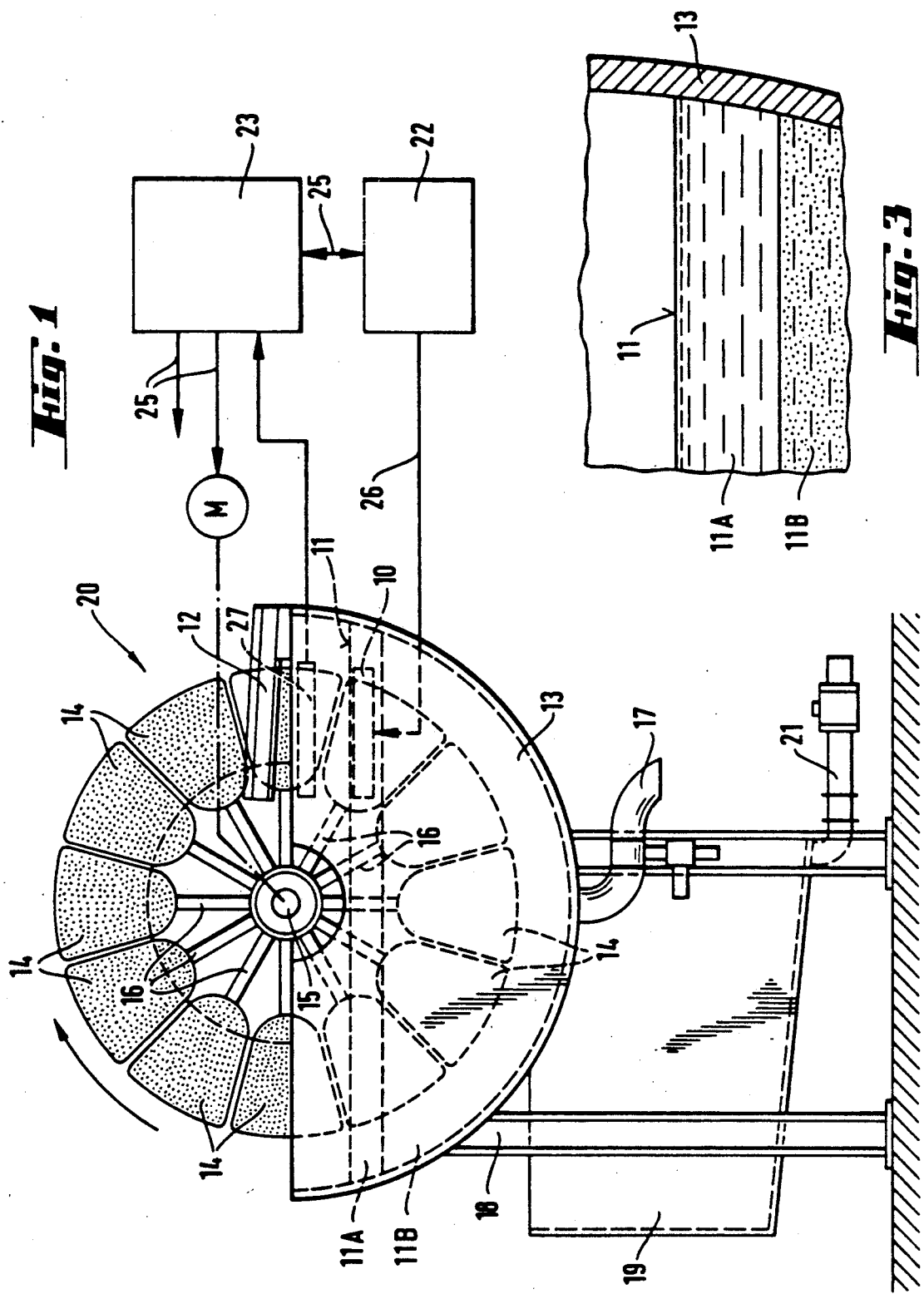

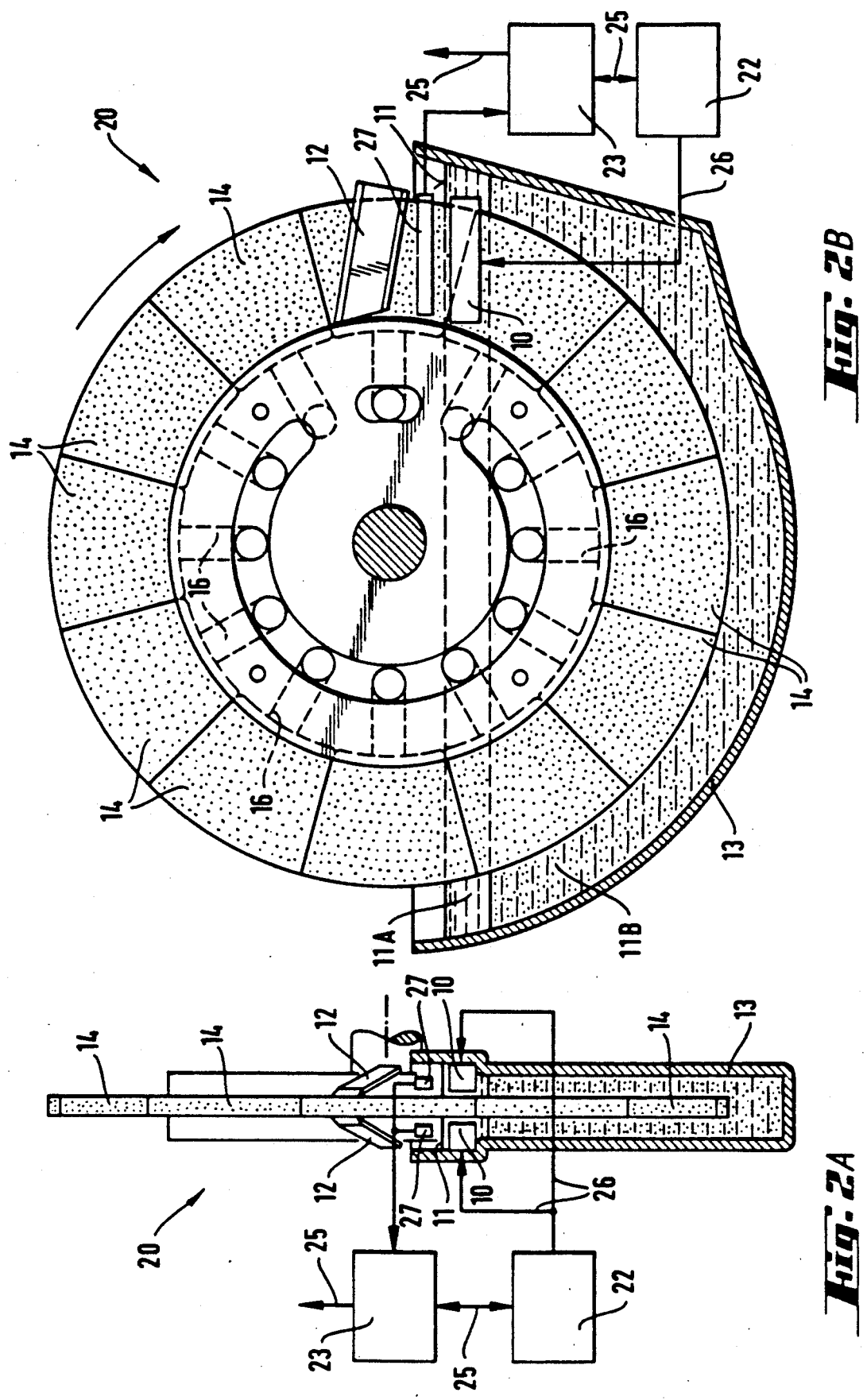

METHOD FOR CLEANING THE FILTER PLATES OF A SUCTION DRIER

The present invention relates to a method for cleaning the filter plates of a suction drier, which suction drier comprises the slurry tank of the slurry to be suction dried, in connection to which tank one or several filter disks, formed of the said filter plates, rotate, and on the surface or surfaces of which filter plates there is gathered and dried a filter cake owing to the suction flow passing through the filter plates, which cake/cakes are scraped or otherwise removed from the filter plate surface or surfaces.

As for the prior art connected to the present invention, the U.S. Pat. No. 4,582,077 is referred to.

In the prior art there are known several different suction driers which comprise filter disks composed of finely porous filter plates. The said disks are rotated in the slurry to be dried, and on the planar surfaces of the filter plates there is gathered, due to the suction, a filter cake, which is scraped off the filter plate surfaces.

As regards new developments of the said suction driers, we refer to the earlier applications—i.e. the FI patent publications 76,702, 76,704 and 77,161—and to the structural details described therein.

The said filter plates, generally ceramic plates, tend to choke, because their porous structure is gradually filled with finely divided material. In the prior art the cleaning of filter plates is attempted by conducting cleaning liquid through them, in a direction opposite to the flow of the removable liquid, the said cleaning liquid generally being water. Moreover, various brush arrangements are used in the external cleaning of the filter plates.

However, by means of these prior art methods and arrangements it has not been possible to maintain the permeability of the filter plates for a sufficiently long time, but it has been necessary to replace the plates very often—too often with respect to their durability otherwise, which operation essentially increases the filter expenses and causes down time in the process.

A prior art method for cleaning the filter plates of a suction drier is described in the applicant's FI patent publication 76,705. In this known solution, the plates contaminated in use are cleaned periodically by means of ultrasonic equipment. The typical working period has been 4–10 days. There are, however, such process situations where the plates of a suction drier are choked in a few minutes. In such cases this prior art solution cannot be applied on an idustrial scale.

The general object of the present invention is to make improvements as for the above discussed drawbacks.

The object of the present invention is to achieve such a cleaning method for suction driers wherein it is not necessary to make essential structural changes in the suction drier itself, and which cleaning method is flexibly available according to the needs of the situation at suitable intervals, so that the natural functions and technical arrangements of the suction drier can be made use of effectively.

A special object of the present invention is to introduce a method and apparatus for cleaning suction drier plates, which method is continuously operated and incorporates surveillance of the state of contamination of the suction drier plates.

In order to achieve the above mentioned aims as well as those to be discussed below, the method of the present invention is mainly characterized in that in order to clean the porous structure and surfaces of the said filter plates, in the tank of the slurry to be filtered there is arranged, under the liquid surface and mainly in the surface water area, an ultrasonic vibrator or vibrators, whereto ultrasonic electric power is fed from an ultrasonic generator, and that the cleaning with the ultrasonic vibrators is carried out essentially immediately after the scraping.

In addition to this, other advantageous characteristics of the invention are described in the claims 2-6.

While employing the method and apparatus of the invention, the usability rate of the suction drier is improved, because the process does not have to be interrupted for washing. Moreover, the suction drier becomes applicable in arrangements where the working periods have so far been too short.

The apparatus of the invention can even be adopted to systems where the plates have choked immediately.

In the following the invention in described in more detail with reference to a preferred embodiment of the invention, illustrated in the figures of the appended drawing, to the details whereof the invention is not limited in any narrow sense.

BRIEF DESCRIPTION OF DRAWINGS

FIG. 1 represents, as a schematical side-view illustration, the suction drier arranged to be cleaned by the method of the present invention.

FIGS. 2A and 2B represent a schematical illustration of the filter plate part of the suction drier arranged to be cleaned by the method of the invention.

FIG. 3 represents a schematical illustration of the sedimentation created in connection with the suction drier.

FIG. 1 illustrates the suction drier 20, which most suitably comprises several filter plates 14 forming a filter disk or disks, which are rotated in connection with the tank 13 of the slurry to be suction dried, the said tank 13 being included in the suction drier 20. The plates 14 are arranged as a circular structure, so that each filter plate 14 is connected, by means of the conduit 16, to the central pipe 15, which is located on the rotating axis. The plates 14 are arranged to pass through the tank 13, which tank 13 may be filled with peat slurry or other such material to be dried. Through the central pipe 15 and the conduits 16, there is conducted underpressure to the filter plates 14.

The structure of the filter plates is for example similar to the one described in the FI patent publications 73,142 and 77,162. The slurry contained in the tank 13, the liquid whereof is meant to be removed, flows, due to the underpressure directed towards the center of the filter plates 14, against the suction surfaces of the plates 14. The slurry water from the tank 13 is further absorbed, owing to the influence of the underpressure, via the suction surfaces of the filter plates 14, to the central space of the plates, and further via the conduits 16 to the central pipe 15 and out of the structure.

When the filter plates 14 are arranged in a circular fashion around the central pipe 15 located on the axis, and when the axis of the suction pipe 15 is set to rotate, each filter plate 14 in turn plunges in the tank 13 and later rises out thereof while the rotation axis rotates. Owing to the underpressure, an amount of the material to be dried, which has stuck on the suction surfaces of the plates 14, rises up from the tank 13 along with the plates 14. While underpressure is maintained, the drying of the material is continued during the said rising motion, and when the material, for instance peat, to be dried has proceeded to the point provided with scraping blades 12 or other such scraping means, the material to be dried is removed off the plate surfaces and discharged from the apparatus. The structure further comprises a support frame 18 which is arranged to support the tank 13. The tank 13 is provided with a discharge pipe 17, and the apparatus 20 also includes a storage tank 19 for the material to be dried, which is further provided with an outlet conduit 21. There is arranged for instance an electric motor to rotate the central rotating axis of the suction pipe 15.

As for the various details of the filter plates 14 and the suction drier 20, we further refer to the FI patent publications 73,142, 76,702, 76,704, 77,162 and 77,161.

According to FIGS. 1 and 2A-2B, in the slurry tank 13 there is arranged in accordance with the present invention a cleaning system for the filter plates 14, which are most suitably ceramic, finely porous filter plates. The cleaning system comprises the ultrasonic vibrators 10, whereto electric power is supplied through the cable 26 from the ultrasonic generator 22. The ultrasonic vibrators 10 are located under the liquid surface 11 in the tank 13, in the surface water area 11A, which area 11A mainly contains clear water owing to the sedimentation created in the tank 13, and under which surface water area IIA there is located the slurry area 11B (FIG. 3). The operation of the ultrasonic generator 22 and of the whole system is controlled for instance by intermediation of the conduit 25 of the control unit 23. From the control unit 23, it is also possible to control the motor rotating the filter plates 14, and, if desired, the operation of other devices as well. As for the various details of the cleaning system, the FI patent application 76,705 is referred to.

According to the invention, the ultrasonic vibrators 10 are installed near the plate, suitably at the distance of about 5 mm, just under the slurry surface 11 in the tank 13, in the surface water area 11A, at the reversed pressure zone. Thus the clear reversed pressure water dilutes the slurry, so that the ultrasound is not attenuated before it meets the plate 14 and thus cleans the plate. In the method of the invention, the choking of the filter plates 14 is observed for instance by means of sensors 27, and when the sensors 27 detect that the filter plates 14 are so badly choked that cleaning is necessary, the ultrasonic generator is switched on through the control unit 23, and simultaneously the ultrasonic vibrators 10 ar switched on.

In the cleaning system of the present invention, the ultrasonic vibrators 10 are placed on both sides of the filter plates. According to the invention, the cleaning takes place immediately after the scraping carried out by the scraping blade 12, in connection with the back-washing. Most suitably the apparatus of the invention is continuously operated, but it can also be operated periodically.

In the method of the present invention, the ultrasonic band created by the ultrasonic vibration 10 is about 2 cm wide and is located in a horizontal position just under the liquid surface 11. The power is chosen so that the plates do not wear or break. The power is over 0.4 W/cm$^2$, most suitably over 0.6 W/cm$^2$. The element can also be attached to the surface to be cleaned, and the size of the element is chosen according to the size of the filter plate 14 to be cleaned, for instance in the following fashion: when the area of the filter plate is 1 m$^2$, the size of the ultrasonic vibrator element is 60×250 mm; when the area of the filter plate is 3 m$^2$, the size of the ultrasonic vibrator element is 60×350 cm.

The cleaning system of the invention is adoptable, in additon to the cleaning of the filter plates of a suction drier, also to a drum filter and roller filter in connection with the backwashing and in other corresponding cleaning systems.

In the above specification, the invention is described with reference to one preferred embodiment only. This does not, however, in any way restrict the present invention to include only this example, but many variations and modifications are possible within the scope of the inventional idea defined in the appended claims.

We claim:

1. A method for cleaning the filter plates of a suction drier, which suction drier (20) comprises the tank (13) of the suction dried slurry, in connection whereof there rotates one or several filter disks formed of the said filter plates (14), on the surface or surfaces of which filter plates (14) there are collected and dried, owing to the suction flow passing through the filter plates (14), a filter cake, which is scraped or otherwise removed off the surface or surfaces of the filter plates (14), characterized in that in order to clean the porous structure and surfaces of the said filter plates (14), in the tank (13) of the slurry to be filtered, under the liquid surface (11) and mainly in the surface water area (11A), there is arranged an ultrasonic vibrator or vibrators (10), whereto ultrasonic electric power is fed from an ultrasonic generator (22), and that the cleaning with the ultrasonic vibrator or vibrators (10) is carried out immediately after scraping.

2. The method of claim 1, characterized in that the cleaning with the ultrasonic vibrator or vibrators (10) is carried out so that a sensor or sensors (27), connected to the ultrasonic vibrator or vibrators (10), which are adjusted to observe the need for cleaning the filter plates (14), inform the ultrasonic generator (22) of the need for cleaning.

3. The method of claim 1 or 2, characterized in that in the method the cleaning carried out with the ultrasonic vibrator or vibrators (10) takes places continuously.

4. The method of any of the claims 1-3, characterized in that the ultrasonic vibrators are located in the immediate vicinity of the filter plates (14), most suitably on both sides of the filter plates.

5. The method of any of the claims 1-2, characterized in that the power of the ultrasound used in the method is over 0.4 W/cm$^2$, most suitably over 0.6 W/cm$^2$.

6. The method of any of the claims 1-2 characterized in that the method is applied in connection with drum filters, in the back flow washing of roller filters and in connection with other corresponding cleaning systems.

* * * * *

UNITED STATES PATENT AND TRADEMARK OFFICE
CERTIFICATE OF CORRECTION

PATENT NO.   :   5,039,347
DATED        :   August 13, 1991
INVENTOR(S)  :   Rolf Hindstrom, Jorma Punju It is certified that error appears in the above-identified patent and that said Letters Patent is hereby corrected as shown below:

Column 3, line 50, "ar" should be --are--.

Column 4, line 51, i.e. Claim 4, line 1, "claims 1 - 3" should read --claims 1 - 2--.

Signed and Sealed this

Twelfth Day of January, 1993

Attest:

DOUGLAS B. COMER

*Attesting Officer*    *Acting Commissioner of Patents and Trademarks*